SEARCH ROOM

2655

X2661

March 1, 1955 — M. W. P. STRANDBERG — 2,703,362

FREQUENCY FINDER SYSTEM

Filed Oct. 19, 1945 — 3 Sheets-Sheet 1

INVENTOR.

MALCOM W. P. STRANDBERG

BY

William D. Hall

ATTORNEY

March 1, 1955 M. W. P. STRANDBERG 2,703,362

FREQUENCY FINDER SYSTEM

Filed Oct. 19, 1945 3 Sheets-Sheet 2

INVENTOR.
MALCOM W. P. STRANDBERG
BY
William D. Hall
ATTORNEY

March 1, 1955 M. W. P. STRANDBERG 2,703,362

FREQUENCY FINDER SYSTEM

Filed Oct. 19, 1945 3 Sheets-Sheet 3

*INVENTOR.*
MALCOM W. P. STRANDBERG
*BY*
William D. Hall
ATTORNEY

United States Patent Office 2,703,362

Patented Mar. 1, 1955

2,703,362

FREQUENCY FINDER SYSTEM

Malcom W. P. Strandberg, Cambridge, Mass., assignor, by mesne assignments, to the United States of America as represented by the Secretary of War Application October 19, 1945, Serial No. 623,387

13 Claims. (Cl. 250—15)

This invention relates generally to an electrical circuit and more specifically to an automatic carrier frequency finder in a modulated radio system.

One object of this invention is to provide means for automatically seeking and locking onto radio signals.

Another object is to provide means for discriminating against sideband frequencies and locking onto the carrier frequency of a modulated radio signal.

Another object is to allow this system to lock onto a radio frequency carrier and emit a radio frequency signal of the same frequency as the carrier.

A further object is to make the operation of said carrier frequency finder relatively independent of the magnitude of said input radio signal.

Other objects, features and advantages of this invention will suggest themselves to those skilled in the art and will become apparent from the following description of the invention taken in connection with the accompanying drawings in which.

Figure 1:
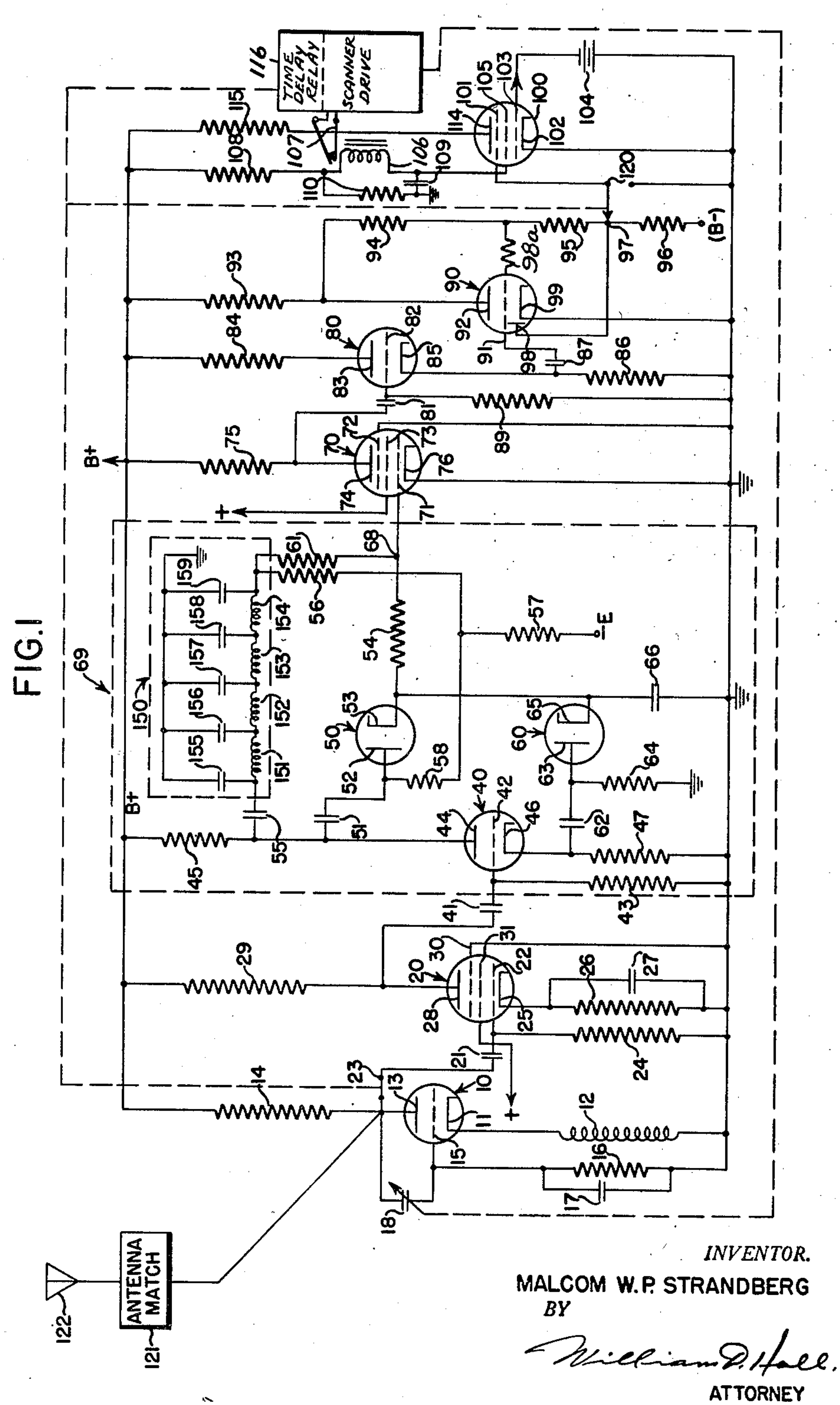
Fig. 1 is a circuit diagram of an automatic carrier frequency finder embodying the principles of this invention.

Referring more specifically to Fig. 1, cathode 11 of oscillator-detector 10 is returned to ground through radio frequency choke 12. Anode 13 is returned through load resistor 14 to a suitable positive potential, B+. Self-bias is provided for oscillator-detector 10 by connecting control grid 15 through a grid leak resistor 16 which is shunted with by-pass condenser 17 to ground. Variable feedback condenser 18 connected between anode 13 and control grid 15 provides ordinary plate to grid feedback and substantially determines the frequency of oscillation of oscillator-detector 10. A radio frequency signal entering through antenna 122 and antenna matching network 121 is injected directly into anode 13 of oscillator-detector 10.

The output of oscillator-detector 10 is taken from anode 13 and applied through coupling capacitor 21 to control grid 22 of video amplifier 20 when switch 23 is closed. Control grid 22 is also returned to ground through grid resistor 24. Cathode 25 of video amplifier 20 is returned to ground through a bias resistor 26 which is shunted with by-pass capacitor 27. Anode 28 of video amplifier 20 is returned through load resistor 29 to a suitable positive potential B+. Suppressor grid 30 is returned directly to ground. Screen grid 31 is returned to a suitable positive potential which has not been shown in the circuit diagram.

The output of video amplifier 20 is taken from anode 28 and applied through coupling condenser 41 to selective amplifier circuit 69. Selective amplifier circuit 69 includes amplifier stage 40, diodes 50 and 60, and the circuit immediately associated with these stages. The input to selective amplifier circuit 69 is applied to control grid 42 of amplifier 40. Control grid 42 is returned through grid resistor 43 to ground. Anode 44 of amplifier 40 is returned through load resistor 45 to a suitable positive potential, B+. Cathode 46 of amplifier 40 is returned through load resistor 47 to ground.

The output of amplifier 40 is taken from anode 44 and applied through coupling capacitor 51 to anode 52 of diode 50. Anode 52 is returned through resistor 58 in series with a resistance 57 to a negative potential —E. Cathode 53 of diode 50 is then connected through resistance 54 to output terminal 68 of selective amplifier 69.

The output of amplifier 40 taken from anode 44 is also applied through coupling capacitor 55 to a low pass filter network 150. Low pass filters are well known in the art and may consist of four inductances 151, 152, 153, and 154 connected in series. Condensers 155, 156, 157, 158 and 159 are connected from either end of each inductance respectively to ground. Inductance 154 is then returned through series resistance 56 and 57 to a suitable negative potential, —E. Resistor 57 is common to the negative voltage feed for anode 52 of diode 50 and the low pass filter 150.

The output of low pass filter 150 is taken from inductance 154 and applied through resistance 61 to output terminal 68 of selective amplifier 69.

The cathode output of amplifier 40 is taken from resistor 47 and applied through coupling condenser 62 to anode 63 of diode 60. Anode 63 is connected through resistor 64 to ground. Cathode 65 of diode 60, which is connected to cathode 53 of diode 50 is connected through storage condenser 66 to ground.

The combined output of low-pass filter 150 and the diodes 50 and 60 appearing at output terminal 68 of selective amplifier 69 is applied to control grid 71 of subtractor tube 70. Suppressor grid 72 and also cathode 76 of subtractor tube 70 are returned directly to ground potential. Screen grid 73 of subtractor tube 70 is returned to a suitable positive potential not shown in the circuit diagram. Anode 74 of subtractor tube 70 is returned through load resistor 75 to a suitable positive potential, B+.

The output of subtractor tube 70 is taken from anode 74 and applied through coupling condenser 81 to control grid 82 of cathode follower 80. Anode 83 of cathode follower 80 is returned through load resistor 84 to a suitable positive potential, B+. Cathode 85 of cathode follower 80 is returned to ground through cathode load resistor 86. Control grid 82 is returned to ground through resistor 89.

The output of cathode follower 80 taken from cathode 85 is applied through coupling condenser 87 to control grid 91 of pulse stretcher tube 90. Anode 92 of pulse stretcher tube 90 is returned through load resistor 93 to a suitable positive potential, B+. Anode 92 is also returned through series resistors 94, 95 and 96, to a suitable negative potential, B—. B— is the negative end of the B+ power supply for the anode potential described above. The common connection of resistor 95 and resistor 96 will be designated as point 97. Diode plate 98 of pulse stretcher tube 90 is connected to point 97. Cathode 99 of pulse stretcher tube 90 is returned directly to ground. Grid 91 of pulse stretcher tube 90 is returned through resistor 98*a* to the common connection point of resistors 94 and 95.

The portion of the output of pulse stretcher tube 90 which appears at point 97 is applied to suppressor grid 101 of amplifier tube 100 when switch 120 is in the up position. When switch 120 is in the down position, suppressor grid 101 is connected to ground potential. Cathode 102 of amplifier tube 100 is returned directly to ground. A suitable bias voltage 104 is applied to control grid 103 of amplifier tube 100 to allow the amplifier to be normally conducting. Screen 105 of amplifier tube 100 is returned through coil 106 of relay switch 107 in series with resistance 108 to a suitable positive potential, B+. Screen 105 is by-passed to ground for alternating frequencies through condenser 109. Damping resistor 110 is connected from the common connection of coil 106 and resistance 108 to ground. Anode 114 of amplifier 100 is returned through load resistor 115 to a suitable positive potential, B+.

Relay switch 107 actuates scanner drive and delay 116. Scanner drive and delay 116 is mechanically coupled to variable feedback capacitor 18 of oscillator-detector 10, to switch 23 in the anode circuit of oscillator-detector 10, and to switch 120 in the suppressor grid circuit of amplifier tube 100.

In briefly explaining the operation of this invention, the oscillator-detector is caused to scan a predetermined band of radio frequencies. When, during the scanning, an incoming modulated signal is encountered, the scanning mechanism drives the oscillator-detector frequency on through the sidebands of the signal and stops at the carrier frequency. The oscillator-detector then is caused to oscillate at the carrier frequency of the input signal and emit a signal of the same frequency as that which is being received.

For a more detailed explanation of the operation of this circuit, reference will now be made to the figures. A pulse modulated signal contains a fundamental frequency plus many harmonic frequencies above and below the fundamental. The fundamental frequency is commonly known as the carrier frequency, and the harmonics, the sideband frequencies of the signal.

Figure 2:
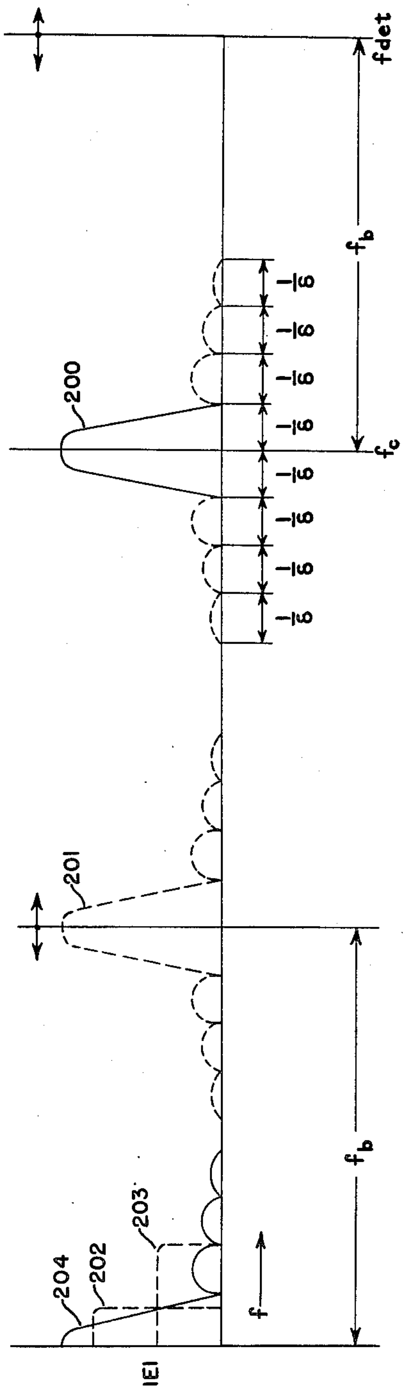
Fig. 2 is the frequency spectrum of a pulse which is likely to be encountered in a modulated radio system.

The frequency spectrum envelope of an incoming pulse will be similar to curve 200 of Fig. 2 in which the absolute magnitude $|E|$ of each harmonic of the carrier frequency $f_c$, is plotted as a function of frequency. The frequency spectrum envelope of a pulse, when indicated in this manner, is a common type graphical representation of the relative magnitudes of the harmonics contained in a pulse. It can be seen that the magnitude of the harmonics passes through zero at intervals of $$\frac{1}{\delta}$$

from the carrier frequency where $\delta$ is the duration of the pulse in microseconds.

The main lobe frequencies will hereafter refer to the band of frequencies contained in the interval $$\frac{1}{\delta}$$

on either side of the carrier frequency. The side lobe frequencies will then be those frequencies contained in each of the remaining intervals of $$\frac{1}{\delta}$$

As the oscillator-detector frequency, $f_{det}$, is varied through each frequency contained in the spectrum of the input pulse, a video pulse appears at the anode of the oscillator-detector. The magnitude of the video pulses will depend upon the strength of the input pulse signal and also the instantaneous frequency to which the oscillator-detector is tuned.

The frequency spectrum envelope of the video pulse of the oscillator-detector is shown by curve 201 of Fig. 2. It is symmetrically centered about the frequency $f_b$ which in this case is the beat frequency between the frequency of the input signal and the frequency of the oscillator-detector. Each frequency contained under the envelope, (excluding the beat frequency $f_b$), is a sideband frequency. The amplitude of the sideband frequencies passes through zero at successive intervals of $$\frac{1}{\delta}, \frac{2}{\delta}$$

etc., microseconds from the beat frequency where $\delta$ is again the duration of the pulse in microseconds.

The video pulses are applied to the grid of the video amplifier 20 where they are amplified and inverted. The bandwidth of the video amplifier must be fairly broad to pass a video pulse. If an amplifier passes all frequencies up to the first interval $$\frac{1}{\delta}$$

it will give a fairly good reproduction of the input pulse because this area under the spectrum envelope includes a large proportion of a total area.

The series of pulses is applied to amplifying tube 40 with the result that inverted signals appear at the plate while inphase signals appear at the cathode. If the bandwidth of the cathode circuit is approximately equal to the bandwidth of video amplifier 20, the signals appearing at diode 60 will have approximately the same configuration as those on the grid of amplifier tube 40. The low-pass filter between the plate of amplifier tube 40 and the grid of amplifier tube 70 narrows the bandwidth of the anode circuit considerably.

In Fig. 2, curve 202 shows the response of the anode circuit and curve 203 the response of the cathode circuit of amplifier tube 40. The response of a circuit is an indication of the relative gain of the band of frequencies which appear at the output of the circuit. The bandwidth of the cathode and the anode circuits is that band of frequencies included between points of .707 of the maximum gain of that channel. The response curves shown herein are theoretical, since the sharp cut off frequencies indicated are not realized in circuits of common use.

In explaining the operation of the selective amplifier circuit 69, reference will now be made to the curves of Figs. 3 and 4. For the purposes of explanation, it will first be assumed that a positive pulse appears at the grid of amplifier tube 40 and later the action will be explained when a negative pulse appears.

The positive pulse on the cathode of amplifier tube 40 will appear at the cathode of diode 60 and impart a charge on condenser 66, which is then caused to leak off slowly. The charge and discharge of condenser 66 is shown by curve *a* of Fig. 3.

The negative pulse appearing at the anode of amplifier tube 40 will be delayed by action of the low-pass filter. In this case, the negative pulse is delayed so that it will occur with the peak of the voltage variation on condenser 66 as shown by curve *b* of Fig. 3. The filter also imparts a series of damped oscillations following the negative pulse of the filter output.

Figures 3, 4:
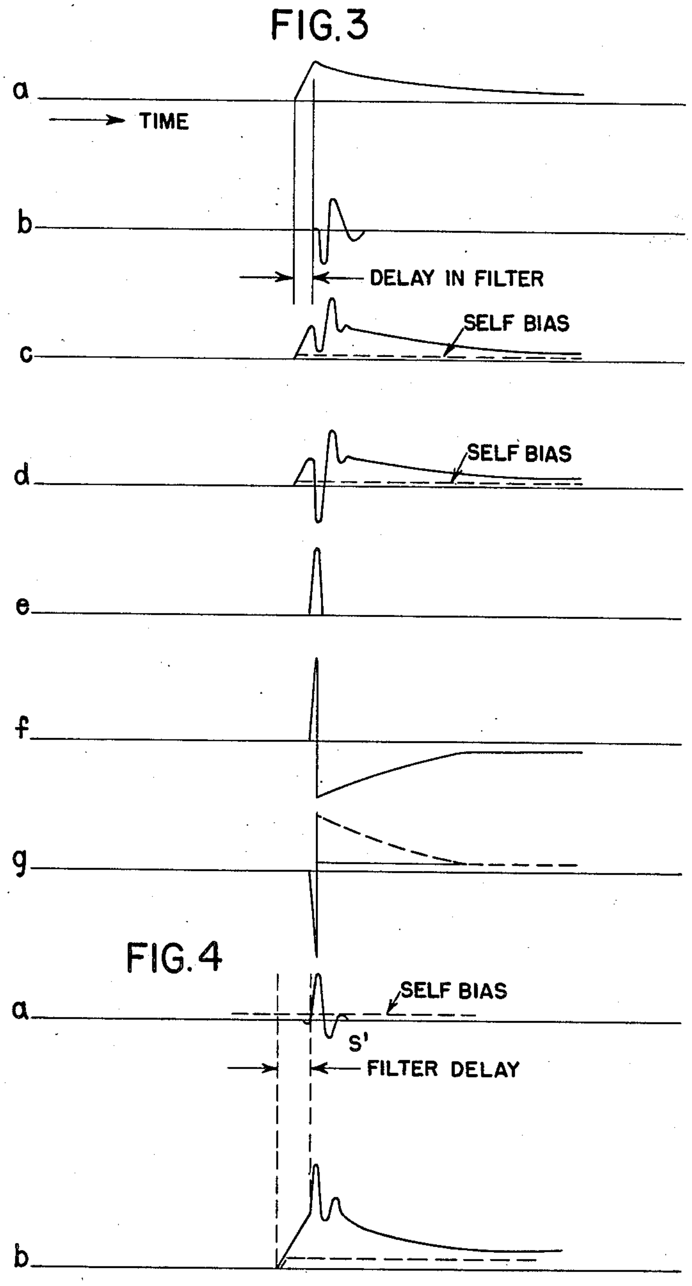
Figs. 3 and 4 show curves which will be used in the explanation of the operation of this invention.

The result of adding the signals from the filter and from the diode 60 and the signal which appears at the grid of subtractor tube 70 is shown by curve *c* of Fig. 3.

With the charge on condenser 66 as described, grid current will flow in subtractor tube 70 and leave a slightly positive self-bias on that stage. The self-bias on subtractor tube 70 is shown in curves *c* and *d* of Fig. 3 by the dotted lines. It can be seen that unless the negative peak of the filter output exceeds the positive peak value of the voltage on condenser 66, subtractor tube 70 will not be cut off. It will now be shown that this occurs only when the oscillator-detector frequency has passed through the sideband frequencies and to reach the carrier frequency of the input signal.

As the beat frequency, $f_b$, between the oscillator-detector frequency, $f_{det}$, and the carrier frequency $f_c$ is varied, the harmonics present in the sidebands of the pulse frequency spectrum 201 are driven first into the cathode response curve 203 and then into the narrow anode response curve 202.

Unless the beat frequency, $f_b$, is substantially zero, the overall gain of the positive pulse passed by the cathode circuit of amplifier tube 40 will exceed the overall gain of the negative pulse passed by the anode circuit of amplifier tube 40 and subtractor tube 70 will not be cut off. This will occur because the total gain of the frequencies passed is proportional to the total area of the sideband frequencies contained within the respective cathode and anode response curves. The total area of the sideband frequencies contained within the cathode response curve will exceed that contained within the anode response curve until the beat frequency becomes zero. When the oscillator frequency is driven through the sidebands to reach the signal frequency, the beat frequency becomes zero. The frequency spectrum envelope will then be centered about the cathode and anode response curves of amplifier tube 40 as shown by curve 204 in Fig. 2.

When the oscillator-frequency reaches the frequency of the input signal carrier, the output of the filter circuit increases greatly and there is a sharp dip in the grid signal of the subtractor tube 70. Under these conditions the waveform on the grid of subtractor tube 70 will be similar to curve *d* of Fig. 3.

The resulting positive output pulse at the plate of the subtractor tube 70 will be similar to curve *e* of Fig. 3.

The cathode follower passes the positive pulse to the grid of pulse stretcher tube 90. The signal on the grid of pulse stretcher tube 90 is similar to that of curve *f* of Fig. 3. The negative dip in curve *f* is a result of the charge left on condenser 87, the flow of grid current, and the inability of a condenser to follow quick changes in potential. This charge on condenser 87 then gradually leaks off and serves to extend or stretch the period of the short pulse from cathode follower 80.

Pulse stretcher tube 90 is normally biased so that some anode current is flowing. It will therefore amplify and invert the signal upon its grid. The variation in potential at anode 92 of pulse stretcher tube 90 will tend to appear in part at point 97. The waveform at point 97 would be similar to the solid negative pulse followed by the dotted curve as shown in curve *g* in Fig. 3, if it were not for clamping action of the diode portion of pulse stretcher tube 90. The diode portion of pulse stretcher tube 90 conducts when the potential of point 97 rises slightly above zero and the potential of point 97 is thereby clamped approximately to this positive potential. The modified waveform at point 97 now appears as the solid negative pulse followed by a low long voltage pulse as shown by the solid curve *g* of Fig. 3.

The bias potential applied to control grid 103 and to suppressor grid 101 of amplifier tube 100 is such as to allow screen current to normally flow and to prevent plate current from flowing.

Conduction current through screen grid 105 therefore flows through relay coil 106 of amplifier tube 100. This normal flow of screen current through relay coil 106 is sufficient to energize the relay and maintain switch 107 closed. The latter operates the scanner drive and delay unit 116. When the carrier frequency is reached the potential on the suppressor grid of the amplifier tube 100 is raised and plate current flows. There is a substantial decrease in screen current, which is sufficient to de-energize relay coil 106 and open switch 107. The scanner drive is stopped immediately. The scanner drive therefore continues to operate until the oscillator-detector frequency is driven through the sideband frequencies to reach the carrier frequency.

If switch 107 continues to remain open for a specified interval, indicating a steady signal input to the oscillator-detector, a slow-acting relay (included in scanner drive 116 as the "delay" element thereof) closes completely, switch 23 in the anode circuit of the oscillator-detector 10 is opened, and switch 120 moves to the downward position. The above action grounds the suppressor grid of amplifier tube 100 and the oscillator becomes a high-powered generator of radio frequency energy which is caused to radiate from antenna 122. The delay relay prevents the system from stopping and radiating the signal of a random pulse.

The function of the selective amplifier circuit 69 will now be explained with reference to Figs. 1 and 4 when a negative pulse appears at the grid of amplifier tube 40. The filter delay and the level of self-bias of subtractor tube 70 shown in curves *a* and *b* of Fig. 4 is the same as that described in connection with the curves of Fig. 3. A negative pulse will appear at the cathode of amplifier tube 40 but will not be passed through diode 60. However, the negative pulse is inverted and the resulting positive pulse at the anode of amplifier tube 40 would appear at the output of the delay line as curve *a* of Fig. 4 if simply delayed by the delay line. It can be seen that the negative oscillatory swing of the filter output is of low amplitude. However, this negative swing may be appreciable and unless means are provided to eliminate this, subtractor tube 70 would be cut off and produce an output pulse.

In placing diode 50 in the plate circuit of amplifier tube 40, the positive pulse will be passed directly to condenser 66 imparting a charge thereto. The charge and discharge of condenser 66 will be similar to that described in connection with the charge and discharge curve *a* of Fig. 3. The combined output of the selective amplifier when a negative pulse is supplied to the amplifier will now be the sum of curve *a* of Fig. 4 and curve *a* of Fig. 3 or curve *b* of Fig. 4. For a negative pulse input to amplifier tube 40 subtractor tube 70 will not be made non-conducting. Hence, subtractor 70 produces output pulses only for positive pulses appearing at the grid of amplifier 40.

Figure 5:
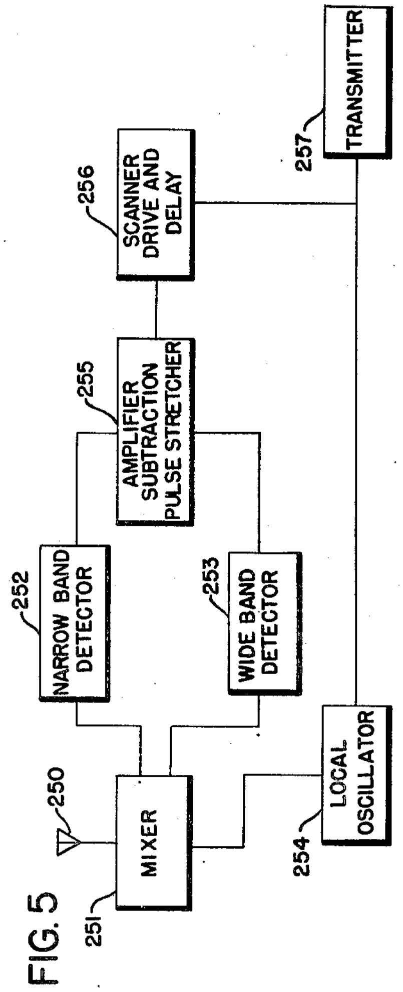
Fig. 5 is a block diagram of an alternate embodiment of this invention.

This circuit has been described on the basis of D.-C. detection. However, it may be modified to operate about any chosen reference frequency. In Fig. 5 is shown a block diagram of one possible embodiment of a circuit to replace the circuit shown in Fig. 1.

In Fig. 5 an incoming radio signal enters antenna 250 where it is injected into mixer 251. From mixer 251 the signal is separated into two channels and applied to a narrow band detector 252 and a wide band detector 253 both centered about a reference frequency. The reference frequency in this case will be the intermediate frequency between the local oscillator 254 frequency which is applied to mixer 251 and the signal input frequency. The detector outputs are added in phase opposition, amplified, and stretched by subtractor, amplifier, and stretcher 255 and fed to scanner drive and delay unit 256, just as has been described in connection with the circuit of Fig. 1. In this embodiment the scanner drive controls the frequency of the local oscillator and a radio frequency transmitter 257.

These circuits are relatively insensitive to the magnitude of the input signal because when the pulse spectrum is centered about the cathode and anode response curves of amplifier tube 40, the magnitude of the output negative pulse of the anode circuit is always proportional to the magnitude of the positive output pulse of the cathode circuit.

It is evident that with a single stage used as an oscillator and detector, simplicity of construction and accuracy of tuning are advantageous. However, a separate oscillator and detector may be used for the case of D.-C. detection.

While there has been described hereinabove what is at present considered to be a preferred embodiment of this invention, it will be obvious to those skilled in the art that various changes and modifications may be made therein without departing from the scope of the invention.

What is claimed is:

1. A signal responsive system comprising means for finding the unknown carrier frequency of a received modulated radio signal, said means comprising a radio-frequency oscillator having tuning means therein, normally operative means coupled to said tuning means for scanning the oscillator frequency over a given frequency range, means for zero beating said modulated signal with said oscillator signal to obtain a beat frequency signal, a first channel having a frequency pass-band adjacent a reference frequency equal to zero which is wide enough to pass a substantial portion of the frequency spectrum of said beat frequency signal, the gain of said first channel being substantially uniform throughout its pass-band, a second channel comprising a low-pass filter having a frequency pass-band adjacent said reference frequency which is substantially narrower than the spectrum of said beat frequency signal, said second channel having a maximum gain in the region of said reference frequency which is greater than that of said first channel, means for applying said beat frequency signal to the inputs of both said first and second channels, polarized means for generating an output in response to a triggering signal of a particular polarity being applied to the input thereof, means for combining the outputs of said first and second channels to obtain a triggering signal proportional to the difference thereof, said triggering signal having said particular polarity only when the output of said second channel is greater than the output of said first channel, means for applying said triggering signal to said polarized means, means controlled by the output of said polarized means for rendering said scanning means inoperative, a transmitter comprising said radio-frequency oscillator and an antenna coupled to the output of said oscillator, and means including delay means coupled between said scanning means and said transmitter for causing said transmitter to transmit at the carrier frequency of said received radio signal in response to a continued actuation for longer than a predetermined time interval of said means for rendering said scanning means inoperative.

2. A signal receiver system, comprising means for finding the unknown carrier frequency of a modulated signal, said means comprising a radio-frequency oscillator having tuning means therein, normally operative means coupled to said tuning means for scanning the oscillator signal frequency over a given frequency range, means for zero beating said modulated signal with said oscillator signal to obtain a beat frequency signal, a first channel having a frequency pass-band adjacent a reference frequency equal to zero which is wide enough to pass a substantial portion of the frequency spectrum of said beat frequency signal, the gain at said first channel at said reference frequency being no less than at other portions of said pass-band, a second channel having a frequency pass-band adjacent said reference frequency which is substantially narrower than the spectrum of said beat frequency signal, said second channel having a maximum gain in the region of said reference frequency which is greater than that of said first channel, means for applying said beat frequency signal to the inputs of both said first and second channels, polarized means for generating an output in response to a triggering signal of a particular polarity being applied to the input thereof, means for combining the outputs of said first and second channels to obtain a triggering signal proportional to the difference thereof, said triggering signal having said particular polarity only when the output of said second channel is greater than the output of said first channel, means for applying said triggering signal to said polarized means, means controlled by the output of said polarized means for rendering said scanning means inoperative, radiating means coupled to said oscillator, said modulating signal being received by said radiating means and being applied to said oscillator thereby, said oscillator including therein said beating means providing said beat frequency signal, means coupled to said scanning means for disconnecting said oscillator from both said channels and for maintaining said scanning means inoperative in response to a continued actuation for longer than a predetermined time interval of said means for rendering said scanning means inoperative, whereby the oscillator signal is transmitted by said radiating means at the carrier frequency of the modulated signal.

3. A system according to claim 2, wherein said means for rendering said scanning means inoperative includes means for stretching the duration of the output of said polarized means.

4. In a system for determining the carrier frequency of pulse modulated signals having a short duration relative to the time interval between said signals, means for deriving from said signals beat frequency pulses, a first channel having a pass-band about a reference sufficiently wide to pass a susbtantial portion of the frequency spectrum of said beat frequency pulses, a second channel having a pass-band about said reference frequency which is substantially narrower than that of said first channel and having a gain about said reference frequency which is substantially greater than that of said first channel about said reference frequency, means for applying said beat frequency pulses to said first and second channels, an integrating circuit in said first channel having a relatively short charging time constant and a discharging time constant longer than said charging time constant but sufficiently short to allow susbtantial discharge of said circuit during the interval between said pulses, means in said first channel for applying said beat frequency pulses to said integrating circuit, means in said second channel for delaying the output thereof an interval substantially equal to the charging time of said integrating circuit and a signal translation circuit coupled to the outputs of said first and second channels and responsive thereto when the output of said second channel is of greater amplitude than that of said first channel.

5. In a system as set forth in claim 4, means for applying said beat frequency pulses in opposite phase to said first and second channels.

6. In a system as set forth in claim 4, said means for applying said beat frequency pulses to said first and second channels comprising an electron discharge device having an anode, cathode and control grid, a source of reference potential, a first resistor connected between said cathode and said source of reference potential, a source of positive potential with respect to said reference potential, a second resistor connected between said anode and said source of positive potential, said detected pulse being applied to said control grid, and the inputs of said first and second channels being coupled to said cathode and anode, respectively.

7. In a system as set forth in claim 6, said means in said first channel for applying said beat frequency pulses to said integrating circuit comprising a first rectifier with an input terminal and output terminal, said input terminal being coupled to said cathode and said output terminal to said integrating circuit, said rectifier passing current in a given direction with respect to said cathode.

8. In a system as set forth in claim 7, a second rectifier coupled between said anode and said output terminal of said first rectifier and connected to pass current in the same direction with respect to said anode as the direction of current flow in said first detector with respect to said cathode.

9. In a system for determining the carrier frequency of pulse modulated signals having a short duration relative to the time interval between said signals, means for deriving from said signals beat frequency pulses, an electron tube having at least an anode, cathode and control grid, means for applying said beat frequency pulses to said control grid, a source of reference potential, a source of positive potential with respect to said reference potential, a load resistor connected between said source of positive potential and said anode, a cathode resistor connected between said source of reference potential and said cathode, a first channel coupled to said cathode having a substantially flat-topped pass-band about a reference frequency, sufficiently wide to pass a substantial portion of the frequency spectrum of said beat frequency pulses, said channel comprising a diode having its anode coupled to the cathode of said electron tube, and an integrating circuit having a relatively short charging time constant and a discharging time constant longer than said charging time constant but sufficiently short to allow susbtantial discharge of said circuit during the time interval between said pulses comprising a storage capacitor connected between the cathode of said diode and said source of reference potential, a second channel coupled to said anode having a pass-band about said reference frequency which is substantially narrower than the pass-band of said first channel and having a gain which is substantially greater than that of said first channel about said reference frequency, said second channel comprising a filter network having a delay characteristic substantially equal to the charging time of said integrating circuit, a second diode having its anode coupled to the anode of said electron tube and its cathode to the cathode of said first diode, a source of negative bias potential connected to the anode of said second diode, and a subtractor circuit coupled to the outputs of said first and second channels for combining said outputs and for obtaining a trigger signal therefrom proportional to the differences in amplitudes thereof in response to a signal output from said second channel of greater amplitude than that of said first channel.

10. A circuit comprising a source of pulses having a short duration relative to the time interval between said pulses, a first channel having a pass-band about a reference frequency sufficiently wide to pass a substantial portion of the frequency spectrum of said pulses, a second channel having a pass-band about said reference frequency which is substantially narrower than that of said first channel and having a gain about said reference frequency which is substantially greater than that of said first channel about said reference frequency, means for applying said pulses to said first and second channels, an integrating circuit in said first channel having a relatively short charging time constant and a discharging time constant longer than said charging time constant but sufficiently short to allow substantial discharge of said circuit during the time interval between said pulses, means in said first channel for applying said pulses to said integrating circuit, means in said second channel for delaying the output thereof an interval susbtantially equal to the charging time of said integrating circuit, and an output circuit coupled to the outputs of said first and second channels for deriving therefrom a control signal when the output of said second channel is of greater amplitude than that of said first channel.

11. A signal responsive system, comprising means for finding the unknown carrier frequency of pulse modulated signals having a short duration relative to the time interval between said signals, said means comprising a radio-frequency oscillator having tuning means therein, normally operative means coupled to said tuning means for scanning the oscillator signal frequency over a given frequency range, means for beating said modulated signals with said oscillator signal to obtain beat frequency pulses, a first channel having a pass-band about a reference frequency which is wide enough to pass a substantial portion of the frequency spectrum of said beat frequency pulses, the gain of said first channel at said reference frequency being no less than at other portions of said pass-band, an integrating circuit in said first channel having a relatively short charging time constant and a discharging time constant longer than said charging time constant but sufficiently short to allow substantial discharge of said circuit during said time interval between pulses, a second channel having a pass-band about said reference frequency which is substantially narrower than the spectrum of said beat frequency pulses, means in said second channel for delaying signals applied thereto an interval substantially equal to the charging time of said integrating circuit, said second channel having a maximum gain in the region of said reference frequency which is greater than that of said first channel, means for applying said beat frequency pulses to the inputs of both said first and second channels, polarized means for generating an output in response to a triggering signal of a particular polarity being applied to the input thereof, means for combining the integrated output of said first channel with the delayed output of said second channel to obtain a triggering signal proportional to the difference in amplitudes thereof, said triggering signal having said particular polarity only when the output of said second channel is of greater amplitude than the output of said first channel, means for applying said triggering signal to said polarized means, and means controlled by the output of said polarized means for rendering said scanning means inoperative.

12. A system according to claim 11, wherein said pulse modulated signals are received radio signals, and further including a transmitter initially tuned to a frequency which differs from said oscillator frequency by said reference in the same sense that the frequency of said pulse modulated signals differs from said oscillator frequency, said transmitter including tuner means for adjusting the frequency to which said transmitter is tuned, and tuner drive means coupled between said scanner means and said tuner means for concurrently tuning said transmitter and said oscillator while maintaining substantially fixed said difference in frequency between said oscillator and said transmitter.

13. In a stop-on-carrier jamming system, an antenna, an autodyne circuit coupled to said antenna for detecting a pulse modulated signal received by said antenna, tuner drive means coupled to said autodyne circuit for tuning the oscillator thereof over a predetermined frequency band, means coupled to the output of said autodyne circuit for deriving from a detected pulse signal a control signal when said oscillator reaches the carrier frequency of said pulse modulated signal, means coupled between said last-named means and said tuner drive means for stopping said tuner drive means in response to said control signal, and means responsive to a continued application for longer than a predetermined time interval of said control signal to said means for stopping said tuner drive means for decoupling said control signal producing means from said autodyne circuit and maintaining said scanning means in its stopped position, whereby said oscillator supplies signals to said antenna at the carrier frequency of said pulse modulated signal.

References Cited in the file of this patent

UNITED STATES PATENTS

| | | |
|---|---|---|
| 2,056,200 | Lowell | Oct. 6, 1936 |
| 2,112,826 | Cook | Apr. 5, 1938 |
| 2,148,532 | Chaffee | Feb. 28, 1939 |
| 2,155,821 | Goldsmith | Apr. 25, 1939 |
| 2,217,957 | Lewis | Oct. 15, 1940 |
| 2,262,218 | Andrews | Nov. 11, 1941 |
| 2,266,154 | Blumlein | Dec. 16, 1941 |
| 2,281,982 | Leyn | May 5, 1942 |
| 2,377,326 | Crosby | June 5, 1945 |
| 2,389,025 | Campbell | Nov. 13, 1945 |
| 2,389,948 | Bartels | Nov. 27, 1945 |
| 2,418,139 | Preisman | Apr. 1, 1947 |
| 2,526,266 | O'Brien | Oct. 17, 1950 |
| 2,532,589 | Wu | Dec. 5, 1950 |
| 2,567,261 | Williams | Sept. 11, 1951 |
| 2,577,520 | Hare | Dec. 4, 1951 |